United States Patent
Chakraborty et al.

(10) Patent No.: US 8,708,047 B2
(45) Date of Patent: Apr. 29, 2014

(54) METHOD OF COOLING DOWNHOLE ELEMENT USING NANOENHANCED DOWNHOLE FLUID

(75) Inventors: Soma Chakraborty, Houston, TX (US); Michael H. Johnson, Katy, TX (US); Oleg A. Mazyar, Houston, TX (US)

(73) Assignee: Baker Hughes Incorporated, Houston, TX (US)

( * ) Notice: Subject to any disclaimer, the term of this patent is extended or adjusted under 35 U.S.C. 154(b) by 200 days.

(21) Appl. No.: 13/213,702

(22) Filed: Aug. 19, 2011

(65) Prior Publication Data

US 2013/0043028 A1    Feb. 21, 2013

(51) Int. Cl.
*E21B 36/00* (2006.01)

(52) U.S. Cl.
USPC ............................................. 166/302; 175/17

(58) Field of Classification Search
USPC ............................................ 175/17; 166/302
See application file for complete search history.

(56) References Cited

U.S. PATENT DOCUMENTS

| | | | |
|---|---|---|---|
| 6,166,095 A | 12/2000 | Bryan et al. | |
| 6,530,438 B1 | 3/2003 | McIntyre | |
| 7,348,298 B2 | 3/2008 | Zhang et al. | |
| 8,020,621 B2 * | 9/2011 | DiFoggio et al. | 166/302 |
| 2009/0298725 A1 | 12/2009 | Zhang et al. | |
| 2010/0218993 A1 * | 9/2010 | Wideman et al. | 175/17 |
| 2010/0272515 A1 | 10/2010 | Curlett | |
| 2010/0314118 A1 | 12/2010 | Quintero et al. | |
| 2012/0032543 A1 * | 2/2012 | Chakraborty et al. | 310/90 |
| 2012/0118647 A1 * | 5/2012 | John et al. | 175/107 |

OTHER PUBLICATIONS

International Search Report and Written Opinion; International Application No. PCT/US2012/051137; International Application Date: Aug. 16, 2012; Date of Mailing: Jan. 31, 2013; 10 pages.
Soma Chakraborty et al., pending U.S. Appl. No. 13/021,137 entitled "Oil Composition Comprising Functionalized Nanoparticles" filed with the U.S. Patent and Trademark Office on Feb. 4, 2011.

* cited by examiner

*Primary Examiner* — William P Neuder
(74) *Attorney, Agent, or Firm* — Cantor Colburn LLP

(57) ABSTRACT

A method of transferring heat to or from a downhole element comprising contacting a downhole fluid comprising a fluid medium, and a nanoparticle, the nanoparticle being uniformly dispersed in the downhole fluid, to a downhole element inserted in a downhole environment. A method of cooling a downhole element, and a method of drilling a borehole are also disclosed.

11 Claims, 1 Drawing Sheet

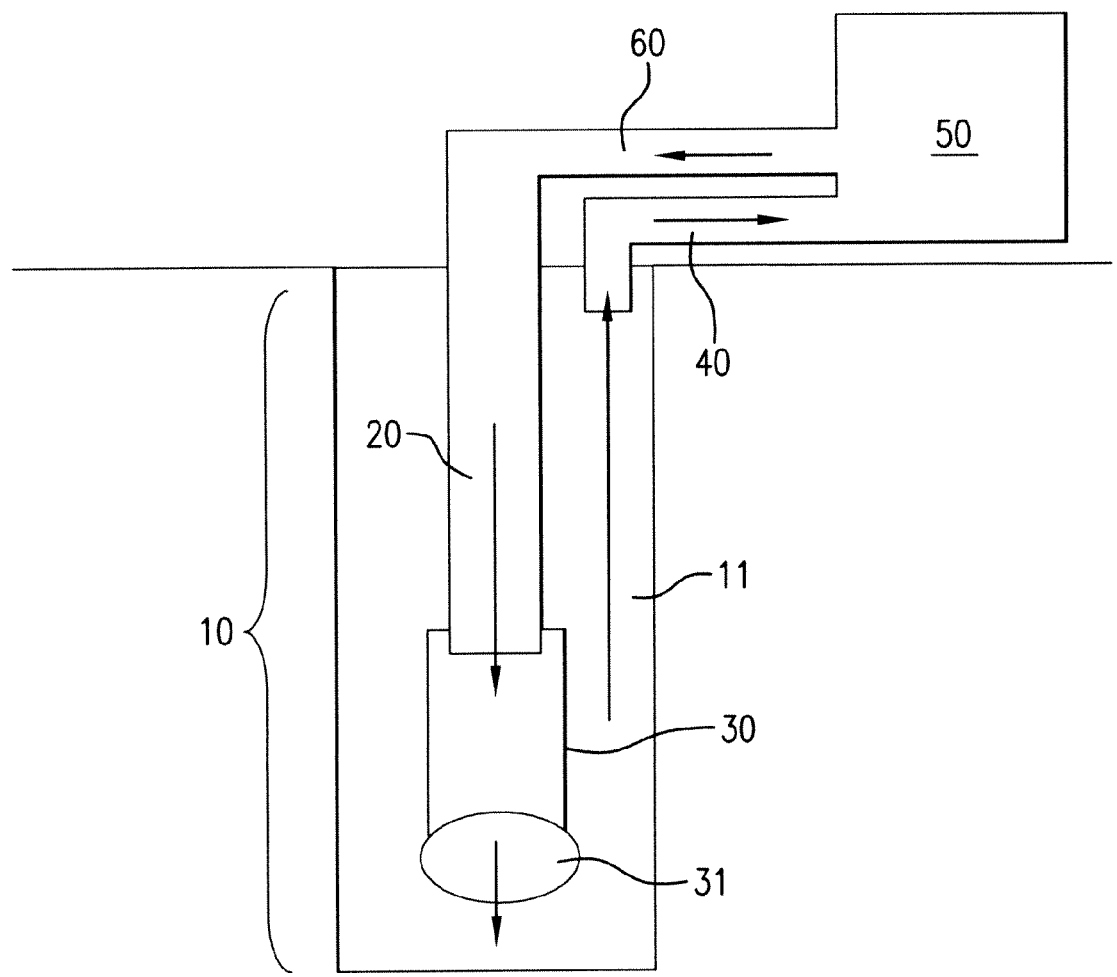

METHOD OF COOLING DOWNHOLE ELEMENT USING NANOENHANCED DOWNHOLE FLUID

BACKGROUND

Downhole fluids are used for a variety of different downhole operations including for example drilling, lubrication, remediation and completion operations. These fluids include both aqueous-based fluids in which solid particles are suspended in a continuous phase of water or brine, and non-aqueous based fluids. Oil can also be emulsified in the aqueous-based fluid in which water remains as the continuous phase.

For operations such as drilling, and for other applications such as wellbore imaging, it is useful to manage heat generated by the operations (e.g., by wellbore drilling) or ambient heat found in downhole conditions encountered by the downhole elements (drill bits, wellbore imaging tools such as logging while drilling (LWD) and monitoring while drilling (MWD) tools, etc.). Decreasing the thermal load on such tools provides improvements in efficiency and life-cycle of this equipment.

It is therefore desirable to further improve heat transfer and effect more efficient cooling of downhole elements to achieve enhanced efficiency and longevity in downhole elements for drilling, imaging, and equipment for other downhole operations.

SUMMARY

The above and other deficiencies of the prior art are overcome by, in an embodiment, a method of transferring heat to or from a downhole element, comprising contacting a downhole fluid comprising a fluid medium, and a nanoparticle, the nanoparticle being uniformly dispersed in the downhole fluid; to a downhole element inserted in a downhole environment.

In another embodiment, a method of cooling a downhole element comprises contacting a downhole fluid comprising a fluid medium, and a nanoparticle, the nanoparticle being uniformly dispersed in the downhole fluid; to a downhole element in a downhole environment, wherein the downhole element has a higher temperature than the downhole fluid and the downhole fluid absorbs heat from the downhole element.

In another embodiment, a method of drilling a borehole comprises contacting a downhole fluid comprising a clay, a fluid medium, an additive, and a nanoparticle, the nanoparticle being uniformly dispersed in the downhole fluid; to a downhole element in a downhole environment before, during, or after drilling, wherein the downhole fluid absorbs heat generated by the downhole element during drilling.

BRIEF DESCRIPTION OF THE DRAWINGS

Referring now to the drawings wherein like elements are numbered alike in the several FIGURES:

The FIGURE shows a schematic view of a method for cooling a downhole element 30 situated in a downhole environment 10 with a downhole fluid.

DETAILED DESCRIPTION

Disclosed herein is a method of heating or cooling a downhole element using a high-efficiency downhole fluid. The downhole fluid is any fluid suitable for downhole use, such as a coolant, lubricant, drilling mud, remediation fluid, completion fluid, fracking fluid, or any such fluid, with heat transfer properties enhanced by the presence of nanoparticles suspended or dispersed in the fluid. Nanoparticles, even where included in fluids in relatively low amounts of e.g., less than 0.5 wt %, impart significantly improved thermal conductivity to such fluids. The nanoparticles are thus included in the downhole fluid in concentrations sufficient to provide this significantly increased thermal conductivity of the fluid relative to a comparable fluid without nanoparticles, or containing particles of the same composition as the nanoparticles but of greater size (for example, with minimum dimensions greater than 1 micrometer).

The method of transferring heat to or from a downhole element thus comprises contacting a downhole fluid comprising a fluid medium and a nanoparticle, to a downhole element inserted in a downhole environment.

The fluid medium is an aqueous fluid, an organic fluid, a gas, or a combination comprising at least one of the foregoing. Exemplary fluid media include water, brine, oil, air, an emulsified mixture of one or more of these, ionic liquids such as imidazolium, pyridinium, and cycloalkylammonium salts, and mixtures thereof, or a combination comprising at least one of the foregoing. As used herein, oils include both oils and nonpolar liquids useful for downhole applications, and that are not aqueous based. Exemplary oils thus include diesel, mineral oil, esters, refinery cuts and blends, alpha-olefins, and the like. Oil-based fluids further include synthetic-based fluids or muds (SBMs) which contain additional solid additives as discussed below. Synthetic-based fluids of this type include ethylene-olefin oligomers, fatty acid and/or fatty alcohol esters, ethers, polyethers, paraffinic and aromatic hydrocarbons, alkyl benzenes, terpenes and the like.

Useful nanoparticle-enhanced downhole fluids are disclosed in copending U.S. Application No. 61/508,199, and useful oils and nanoparticle-enhanced oils, such as lubricating oils, are disclosed in U.S. patent application Ser. No. 13/021,137 filed Feb. 4, 2011, the contents of both of which are incorporated herein by reference in their entirety.

Nanoparticles, uniformly dispersed in the downhole fluid, are also included. Nanoparticles typically have an average particle size (largest average dimension) of about 1 nanometer (nm) to less than about 1 micrometer ($\mu$m). In some embodiments, the nanoparticles have an average particle size of less than about 1 micrometer ($\mu$m), and more specifically a largest average dimension less than or equal to about 500 nanometer (nm), and still more specifically less than or equal to about 250 nm, where particle sizes of greater than about 250 nm to less than about 1 $\mu$m are also be referred to in the art as "sub-micron sized particles." In other embodiments, the average particle size is greater than or equal to about 1 nm, specifically 1 to about 250 nm, and more specifically about 1 to about 100 nm. In still other embodiments, the average particle size (largest dimension) of the nanoparticle is greater than or equal to 1 $\mu$m, specifically 1 to 25 $\mu$m, more specifically 1 to 20 $\mu$m, still more specifically 1 to 10 $\mu$m. As used herein, "average particle size" and "average largest dimension" can be used interchangeably, and refer to particle size measurements based on number average particle size measurements, which can be routinely obtained by laser light scattering methods such as static or dynamic light scattering (SLS or DLS, respectively). Also in an embodiment, the nanoparticles have an aspect ratio of greater than about 10, and more particularly, greater than about 50.

In an embodiment, nanoparticles include a nanographite, graphene, a fullerene, a nanotube, a nanodiamond, a nanoclay, an inorganic nanoparticle, a metal nanoparticle, or a combination comprising at least one of the foregoing.

Nanographite is a nano-scale cluster of plate-like sheets of graphite, in which a stacked structure of one or more layers having a plate-like two dimensional structure of carbon in the form of fused hexagonal rings with an extended delocalized π-electron system, which are layered and weakly bonded to one another through π-π stacking interaction. Nanographite has a layered structure of greater than or equal to about 50 single sheet layers, specifically greater than or equal to about 100 single sheet layers, and more specifically greater than or equal to about 500 single sheet layers.

Graphene, sometimes referred to herein as nanographene, includes both graphene having an average largest dimension of greater than or equal to 1 μm, and nanographene having an average largest dimension of less than 1 μm. Graphenes, including nanographene, are effectively two-dimensional particles of nominal thickness, having a stacked structure of one or more layers of fused hexagonal rings with an extended delocalized π-electron system, layered and weakly bonded to one another through π-π stacking interaction. In an exemplary embodiment, graphene has an average particle size of 1 to 5 μm, and specifically 2 to 4 μm. Graphenes have an average smallest particle size (smallest average dimension, i.e., thickness) of less than or equal to about 50 nm, more specifically less than or equal to about 10 nm, and still more specifically less than or equal to 5 nm. Graphene (including nanographene) has less than about 50 single sheet layers, specifically less than about 10 single sheet layers, and more specifically less than or equal to about 5 single sheet layers, or is as little as a single sheet thick.

Fullerenes, as disclosed herein, include any of the known cage-like hollow allotropic forms of carbon possessing a polyhedral structure. Fullerenes include, for example, from about 20 to about 100 carbon atoms. For example, $C_{60}$ is a fullerene having 60 carbon atoms and high symmetry ($D_{5h}$), and is a relatively common, commercially available fullerene. Exemplary fullerenes include $C_{30}$, $C_{32}$, $C_{34}$, $C_{38}$, $C_{40}$, $C_{42}$, $C_{44}$, $C_{46}$, $C_{48}$, $C_{50}$, $C_{52}$, $C_{60}$, $C_{70}$, $C_{76}$, and the like.

Nanotubes include carbon nanotubes, inorganic nanotubes, metallated nanotubes, or a combination comprising at least one of the foregoing. Nanotubes are tubular structures having open or closed ends and which are inorganic (e.g. boron nitride) or made entirely or partially of carbon. In an embodiment, carbon and inorganic nanotubes include additional components such as metals or metalloids, which are incorporated into the structure of the nanotube, included as a dopant, form a surface coating, or a combination comprising at least one of the foregoing. Nanotubes, including carbon nanotubes and inorganic nanotubes, are single walled nanotubes (SWNTs) or multi-walled nanotubes (MWNTs).

Nanodiamonds are diamond particles having an average particle size of less than one micrometer (μm). The nanodiamonds are from a naturally occurring source, such as a by-product of milling or other processing of natural diamonds, or are synthetic, prepared by any suitable commercial method. Nanodiamonds are used as received, or are sorted and cleaned by various methods to remove contaminants and non-diamond carbon phases present, such as residues of amorphous carbon or graphite.

Nanoclays are hydrated or anhydrous silicate minerals with a layered structure and include, for example, aluminosilicate clays such as kaolins including hallyosite, smectites including montmorillonite, illite, and the like. Exemplary nanoclays include those marketed under the tradename CLOISITE® marketed by Southern Clay Additives, Inc. In an embodiment, nanoclays are exfoliated to separate individual sheets, or are non-exfoliated. Other nano-sized mineral fillers of similar structure can also be included such as, for example, talc, micas including muscovite, phlogopite, or phengite, or the like.

Inorganic nanoparticles include a metal or metalloid carbide such as tungsten carbide, silicon carbide, boron carbide, or the like; a metal or metalloid nitride such as titanium nitride, boron nitride, silicon nitride, or the like; a metal or metalloid oxide such as titanium oxide, alumina, silica, tungsten oxide, iron oxides, combinations thereof, or the like; or a combination comprising at least one of the foregoing.

Metal nanoparticles include, for example, those made from metals such as iron, tin, titanium, platinum, palladium, cobalt, nickel, vanadium, alloys thereof, or a combination comprising at least one of the foregoing. In other embodiments, inorganic nanoparticles include those coated with one or more layers of metals such as iron, tin, titanium, platinum, palladium, cobalt, nickel, vanadium, alloys thereof, or a combination comprising at least one of the foregoing.

The nanoparticles used herein are derivatized to include functional groups, are underivatized, or includes a combination of derivatized and underivatized nanoparticles. Where the nanoparticles are derivatized, the functional groups include, for example, carboxy (e.g., carboxylic acid groups), epoxy, ether, ketone, amine, hydroxy, alkoxy, alkyl, aryl, aralkyl, alkaryl, lactone, functionalized polymeric or oligomeric groups, ionic groups such as ammonium groups and/or carboxylate salt groups, or a combination comprising at least one of the forgoing functional groups. The nanoparticles are derivatized to introduce chemical functionality to the nanoparticle. For example, for nanographene, the surface and/or edges of the nanographene sheet is derivatized to increase dispersibility in and interaction with the polymer matrix.

Exemplary methods of derivatizing to include functional groups include, but are not limited to, reactions such as oxidation or oxidative cleavage of olefins to form alcohols, diols, or carbonyl groups including aldehydes, ketones, or carboxylic acids; diazotization of olefins proceeding by the Sandmeyer reaction; intercalation/metallization of e.g., a nanodiamond, graphene, or nanotube by treatment with a reactive metal such as an alkali metal including lithium, sodium, potassium, and the like, to form an anionic intermediate, followed by treatment with a molecule capable of reacting with the metalized nanoparticle such as a carbonyl-containing species (carbon dioxide, carboxylic acids, anhydrides, esters, amides, imides, etc.), an alkyl species having a leaving group such as a halide (Cl, Br, I), a tosylate, a mesylate, or other reactive esters such as alkyl halides, alkyl tosylates, etc.; molecules having benzylic functional groups; use of trans-metalated species with boron, zinc, or tin groups which react with e.g., aromatic halides in the presence of catalysts such as palladium, copper, or nickel, which proceed via mechanisms such as that of a Suzuki coupling reaction or the Stille reaction; pericyclic reactions (e.g., 3 or 4+2) or thermocyclic (2+2) cycloadditions of other olefins, dienes, heteroatom substituted olefins, or the like.

In an embodiment, the derivatized nanoparticle is hydrophilic, hydrophobic, oxophilic, lipophilic, oleophilic, or possesses a combination of these properties to provide a balance of desirable net properties, by use of different functional groups.

In another embodiment, the nanoparticle is not derivatized, and includes a dispersant. In an embodiment, the dispersant is ionic or non-ionic, and is a fatty acid or derivative thereof, a poly(alkylene oxide), a polysiloxane, a polymeric surfactant, an organic-inorganic medium, or a combination comprising at least one of the foregoing.

Useful surfactants include fatty acids of up to 22 carbon atoms such as stearic acids and esters and polyesters thereof, poly(alkylene glycols) such as poly(ethylene oxide), polypropylene oxide), and block and random poly(ethylene oxide-propylene oxide) copolymers such as those marketed under the PLURONIC™ tradename by BASF. Other surfactants include polysiloxanes, such as homopolymers and copolymers of poly(dimethylsiloxane), including those having functionalized end groups, and the like. Other useful dispersants include those having a polymeric dispersant having poly(alkylene glycol) side chains, fatty acids, or fluorinated groups such as perfluorinated $C_{1-4}$ sulfonic acids grafted to the polymer backbone. Polymer backbones include those based on a polyester, a poly(meth)acrylate, a polystyrene, a poly(styrene-(meth)acrylate), a polycarbonate, a polyamide, a polyimide, a polyurethane, a polyvinyl alcohol, or a copolymer comprising at least one of these polymeric backbones. As used herein, "(meth)acrylate" and "(meth) acrylic" mean monomers based on methacrylic or acrylic acids or methacrylic or acrylic acid esters including methacrylates and acrylates, or a combinations of the two. Particularly useful polymer backbones include those based on poly (meth)acrylate, poly(styrene), poly(styrene-acrylates), and polyvinylalcohols.

In an embodiment, mixtures of nanoparticles are used. For example, combinations of graphene and nanodiamond, graphene and nanotubes, nanodiamonds and nanotubes, and further combinations of functionalized and non-functionalized such species (e.g., functionalized graphene and non-functionalized nanodiamond; non-functionalized graphene and functionalized nanodiamond; and the like) are used. Such combinations provide a balance of desired properties including thermal, viscosity, rheological properties, and the like.

In another embodiment, the downhole fluid is a drilling mud. Drilling muds useful herein include components typical of drilling muds in general, such as components to increase and control viscosity, and provide stability and lubrication for the drilling head during operation. Where the downhole fluid is a drilling mud, the downhole fluid thus further comprises a thixotropic clay, based on a silicate structure, and an additive.

A useful thixotropic clay includes bentonite, montmorillonite, kaolinite, or a combination comprising at least one of the foregoing. Useful additives include an antioxidant, a mineral additive, a salt, a polymer, a surfactant, a shear thinner, a circulation control additive, an acid, a base, a hydroxy-containing organic compound, a viscosifying agent, or a combination comprising at least one of the foregoing additives. Exemplary additives useful in include minerals such as barium sulfate, calcium carbonate, and hematite; polymers such as xanthan gum, guar gum, starch, cellulose; hydroxy-containing organic compounds such as alcohols, glycols, and polyols; amines; shear thinning agents and surfactants such as fatty acid esters, purified paraffin, and isomerized olefins; acids such as hydrochloric acid and sulfuric acid; bases such as sodium or potassium hydroxides and carbonates; or a combination comprising at least one of the foregoing.

In an embodiment, the nanoparticle is included in the downhole fluid in an amount of about 0.01 to about 50 wt %, in another embodiment, about 0.1 to about 40 wt %, and in another embodiment about 1 to about 30 wt %, based on the total weight of the downhole fluid. The downhole fluid containing the nanoparticle in this amount has greater thermal conductivity than a downhole fluid having the same composition but without the nanoparticle.

The method further includes, during contacting of the downhole fluid to the downhole element, injecting the downhole fluid down a drill pipe or other pipe inserted downhole, circulating the downhole fluid on and around the downhole element, returning the downhole fluid to a surface heat exchanger via an annular space surrounding the well pipe, and cooling the downhole fluid by passing the downhole fluid through the surface heat exchanger.

Injecting of the downhole fluid is achieved by any routine means and includes passing a pressurized stream of the downhole fluid down the center of, e.g., a drill pipe or other pipe inserted downhole, and which terminates at or proximate to the downhole element. Circulating of the downhole fluid is accomplished internally to the downhole element, externally to the downhole element, or both. For example, where the downhole element is a drill bit, the downhole fluid passes through the drill bit and out to the surfaces of the drill bit involved in drilling, and circulates by the action of injecting from the surface and/or by the rotary motion of the drill bit during drilling. Contacting time with the surfaces of the downhole element can be controlled by controlling the flow rate of the downhole fluid, by the design of the downhole element (e.g., drill bit) itself and in particular the openings allowing progress of the downhole fluid. In this way, the downhole fluid achieves substantial contact with the downhole element. The downhole fluid is then returned to the surface (e.g., ground level) through an annular space surrounding the drill pipe or other pipe inserted downhole. The downhole fluid is then collected at the surface, and passed through a heat exchanger to either heat or cool the downhole fluid, prior to reinjecting the downhole fluid downhole via the drill pipe or other pipe inserted downhole. In another embodiment, the heat exchanger is installed in the well above or below the article to be cooled. In this way, the ambient temperature of the wellbore is used to dissipate the heat generated at the article into different regions of the wellbore adjacent to the article.

In an embodiment, the downhole fluid is thus injected down the drill pipe after cooling, and partially cools the downhole fluid returning to the surface via the annular space through indirect contact through the drill pipe. The presence of a cooled downhole fluid in a drill pipe, surrounded by a heated downhole fluid (heated by exposure to, e.g., an operating drill bit), effectively pre-cools the returning heated downhole fluid. An equilibrium between the cooled downhole fluid passing down the drill pipe, and the heated downhole fluid returning via the annular space surrounding the drill pipe, can be maintained by a combination of flow rate, cooling at the surface (by the heat exchanger), or a combination of these conditions.

In a further embodiment, the downhole fluid is treated to remove solid residues after returning. Treating thus includes filtering, precipitating, and/or settling to separate solid particulate residues accumulated from the drilling operation.

In an embodiment, the downhole element is a measurement while drilling (MWD) tool, a mud motor, a rotary steerable system, or a logging-while-drilling tool.

In another embodiment, a method of cooling a downhole element includes contacting the downhole fluid comprising the fluid medium, to a downhole element in a downhole environment, wherein the downhole element has (or is operating at) a higher temperature than the downhole fluid and the downhole fluid absorbs heat from the downhole element.

In another method of drilling a borehole includes contacting a downhole fluid comprising the thixotropic clay, the fluid medium, the additive, and the nanoparticle, to a downhole element in a downhole environment before, during, or after drilling, wherein the downhole fluid absorbs heat generated by the downhole element during drilling.

In an exemplary illustration, which is of exaggerated dimensions and not to scale, the FIGURE shows in schematic form a heat transfer operation involving the downhole fluid. In the FIGURE, the nanoparticle-enhanced downhole fluid is injected (arrows show direction of flow of the downhole fluid throughout) into a downhole environment 10 via a drill pipe 20. The downhole fluid passes through downhole element 30 (e.g., where downhole element 30 is shown to be a drill bit) and exits the drilling surface 31 to surround and contact the downhole element 30 by circulating around the downhole element 30 and absorbing heat, before returning to the surface (i.e., ground level surface) via annular space 11. The heated downhole fluid is then returned through a collection means 40 to heat exchanger 50, where the heated downhole fluid is cooled. Prior to cooling, the downhole fluid can be treated to remove particulates resulting from downhole drilling or other operations (not shown). After cooling, the cooled downhole fluid is returned by injection means 60 to drill pipe 20, to complete circulation of the downhole fluid.

While one or more embodiments have been shown and described, modifications and substitutions may be made thereto without departing from the spirit and scope of the invention. Accordingly, it is to be understood that the present invention has been described by way of illustrations and not limitation.

All ranges disclosed herein are inclusive of the endpoints, and the endpoints are independently combinable with each other. The suffix "(s)" as used herein is intended to include both the singular and the plural of the term that it modifies, thereby including at least one of that term (e.g., the colorant(s) includes at least one colorants). "Optional" or "optionally" means that the subsequently described event or circumstance can or cannot occur, and that the description includes instances where the event occurs and instances where it does not. As used herein, "combination" is inclusive of blends, mixtures, alloys, reaction products, and the like. All references are incorporated herein by reference.

The use of the terms "a" and "an" and "the" and similar referents in the context of describing the invention (especially in the context of the following claims) are to be construed to cover both the singular and the plural, unless otherwise indicated herein or clearly contradicted by context. Further, it should further be noted that the terms "first," "second," and the like herein do not denote any order, quantity, or importance, but rather are used to distinguish one element from another. The modifier "about" used in connection with a quantity is inclusive of the stated value and has the meaning dictated by the context (e.g., it includes the degree of error associated with measurement of the particular quantity).

The invention claimed is:

1. A method of drilling a borehole, comprising:
   contacting
      a downhole fluid comprising
         a clay,
         a fluid medium,
         an additive, and
         a nanoparticle, the nanoparticle being uniformly dispersed in the downhole fluid; to
      a downhole element in a downhole environment before, during, or after drilling,
   wherein the downhole fluid absorbs heat generated by the downhole element during drilling.

2. A method of transferring heat to or from a downhole element, the method comprising:
   contacting a downhole fluid comprising:
      a fluid medium which comprises an aqueous fluid; a gas; an ionic liquid; an emulsified mixture of one or more of water, brine, oil, and air; or a combination comprising at least one of the foregoing; and
      a nanoparticle, the nanoparticle being uniformly dispersed in the downhole fluid,
   to a downhole element inserted in a downhole environment,
   wherein the nanoparticle is derivatized to include a functional group, is underivatized, or includes a combination of derivatized and underivatized nanoparticles, and the functional group comprises carboxy, epoxy, ether, ketone, amine, hydroxy, alkoxy, alkyl, aryl, aralkyl, alkaryl, lactone, functionalized polymeric or oligomeric groups, ionic groups, or a combination comprising at least one of the forgoing functional groups.

3. The method of claim 2, wherein the downhole fluid further comprises:
   a nanoparticle which is not derivatized; and
   a dispersant.

4. The method of claim 3, wherein the dispersant is ionic or non-ionic, and is a fatty acid or derivative thereof, a poly (alkylene oxide), a polysiloxane, a polymeric surfactant, an organic-inorganic medium, or a combination comprising at least one of the foregoing.

5. The method of claim 2, wherein the downhole fluid further comprises
   a thixotropic clay, and
   an additive.

6. The method of claim 5, wherein the thixotropic clay is bentonite, montmorillonite, kaolinite, or a combination comprising at least one of the foregoing.

7. The method of claim 5, wherein the additive comprises an antioxidant, a mineral additive, a salt, a polymer, a surfactant, a shear thinner, a circulation control additive, an acid, a base, a hydroxy-containing organic compound, a viscosifying agent, or a combination comprising at least one of the foregoing.

8. The method of claim 5, wherein the additive is barium sulfate, calcium carbonate, hematite, xanthan gum, guar gum, starch, cellulose, alcohols, glycols, polyols, amines, fatty acid esters, purified paraffin, isomerized olefin, or a combination comprising at least one of the foregoing.

9. The method of claim 2, wherein contacting further comprises:
   injecting the downhole fluid down a well pipe,
   circulating the downhole fluid on and around the downhole element,
   returning the downhole fluid to a surface heat exchanger via an annular space surrounding the well pipe, and
   cooling the downhole fluid by passing the downhole fluid through the surface heat exchanger.

10. The method of claim 9, wherein the downhole fluid is injected down the drill pipe after cooling, and partially cools the downhole fluid returning to the surface via the annular space through indirect contact through the drill pipe.

11. The method of claim 2, further comprising treating the downhole fluid to remove solid residues after returning.

\* \* \* \* \*